United States Patent
Cai et al.

(10) Patent No.: US 7,964,993 B2
(45) Date of Patent: Jun. 21, 2011

(54) NETWORK DEVICES WITH SOLID STATE TRANSFORMER AND CLASS AB OUTPUT STAGE FOR ACTIVE EMI SUPPRESSION AND TERMINATION OF OPEN-DRAIN TRANSMIT DRIVERS OF A PHYSICAL DEVICE

(75) Inventors: Jun Cai, Mather, CA (US); Amit Gattani, Roseville, CA (US)

(73) Assignee: Akros Silicon Inc., Folsom, CA (US)

( * ) Notice: Subject to any disclaimer, the term of this patent is extended or adjusted under 35 U.S.C. 154(b) by 950 days.

(21) Appl. No.: 11/682,823

(22) Filed: Mar. 6, 2007

(65) Prior Publication Data
US 2008/0137759 A1 Jun. 12, 2008

Related U.S. Application Data

(63) Continuation-in-part of application No. 11/609,308, filed on Dec. 11, 2006.

(51) Int. Cl.
*H05K 9/00* (2006.01)

(52) U.S. Cl. ........... 307/91; 307/89; 307/90; 307/201; 379/90.01; 379/102.04; 379/169; 379/176; 379/186; 379/307; 379/318; 379/322; 379/323; 379/413; 379/392.01; 379/399.01; 379/412; 379/413.02; 379/416; 330/253

(58) Field of Classification Search ........... 307/91
See application file for complete search history.

(56) References Cited

U.S. PATENT DOCUMENTS

| | | | | |
|---|---|---|---|---|
| 3,806,916 | A * | 4/1974 | Diaz et al. | 341/128 |
| 5,113,148 | A * | 5/1992 | Theus | 330/253 |
| 5,347,224 | A * | 9/1994 | Brokaw | 324/522 |
| 6,407,987 | B1 * | 6/2002 | Abraham | 370/295 |
| 6,624,700 | B2 * | 9/2003 | Luo et al. | 330/281 |
| 6,717,467 | B2 * | 4/2004 | Renous et al. | 330/253 |
| 6,828,856 | B2 * | 12/2004 | Sanchez et al. | 330/253 |
| 2002/0057017 | A1 * | 5/2002 | Chan | 307/18 |
| 2003/0142688 | A1 * | 7/2003 | Chou et al. | 370/420 |
| 2004/0068600 | A1 * | 4/2004 | Cranford et al. | 710/300 |
| 2004/0233898 | A1 * | 11/2004 | Otsuka et al. | 370/352 |
| 2004/0239465 | A1 * | 12/2004 | Chen et al. | 336/173 |
| 2005/0238107 | A1 * | 10/2005 | Yamashita et al. | 375/258 |
| 2006/0238250 | A1 * | 10/2006 | Camagna et al. | 330/253 |

* cited by examiner

*Primary Examiner* — Jared J Fureman
*Assistant Examiner* — Justen Fauth
(74) *Attorney, Agent, or Firm* — Koestner Patent Law; Ken J. Koestner

(57) ABSTRACT

Embodiments disclosed herein describe a network device including a class AB common mode suppression (CMS) circuit coupled in parallel between a line voltage source and a physical layer (PHY) device that provides active EMI suppression and Phy device termination. A network connector is coupled to provide the line voltage source to the class AB CMS circuit. The class AB CMS circuit provides current to the PHY device, terminates open-drain transmit drivers of the PHY device and suppresses common mode noise thereby minimizing electromagnetic interference. In other embodiments, the class AB CMS circuit is coupled in parallel between the network connector and a physical layer (PHY) device. The class AB CMS circuit suppresses common mode noise, and terminates open-drain transmit drivers of the PHY device, thereby minimizing electromagnetic interference.

41 Claims, 7 Drawing Sheets

NETWORK DEVICES WITH SOLID STATE TRANSFORMER AND CLASS AB OUTPUT STAGE FOR ACTIVE EMI SUPPRESSION AND TERMINATION OF OPEN-DRAIN TRANSMIT DRIVERS OF A PHYSICAL DEVICE

CROSS REFERENCE TO RELATED APPLICATIONS

This application claims the benefit of priority to and incorporates herein by reference in its entirety for all purposes, U.S. patent application Ser. No. 11/609,308 entitled "Network Devices With Solid State Transformer And Electronic Load Circuit To Provide Termination Of Open-Drain Transmit Drivers Of A Physical Layer Module," by Amit Gattani filed on Dec. 11, 2006.

BACKGROUND

Many networks such as local and wide area networks (LAN/WAN) structures are used to carry and distribute data communication signals between devices. Various network elements include hubs, switches, routers, and bridges, peripheral devices, such as, but not limited to, printers, data servers, desktop personal computers (PCs), portable PCs and personal data assistants (PDAs) equipped with network interface cards. Devices that connect to the network structure use power to enable operation. Power of the devices may be supplied by either an internal or an external power supply such as batteries or an AC power via a connection to an electrical outlet.

Some network solutions can distribute power over the network in combination with data communications. Power distribution over a network consolidates power and data communications over a single network connection to reduce installation costs, ensures power to network elements in the event of a traditional power failure, and enables reduction in the number of power cables, AC to DC adapters, and/or AC power supplies, which may create fire and physical hazards. Additionally, power distributed over a network such as an Ethernet network may function as an uninterruptible power supply (UPS) to components or devices that normally would be powered using a dedicated UPS.

Additionally, network appliances, for example voice-over-Internet-Protocol (VOIP) telephones and other devices, are increasingly deployed and consume power. When compared to traditional counterparts, network appliances use an additional power feed. One drawback of VOIP telephony is that in the event of a power failure the ability to contact emergency services via an independently powered telephone is removed. The ability to distribute power to network appliances or circuits enable network appliances such as a VOIP telephone to operate in a fashion similar to ordinary analog telephone networks currently in use.

Distribution of power over Ethernet (PoE) network connections is in part governed by the Institute of Electrical and Electronics Engineers (IEEE) Standard 802.3 and other relevant standards, which are incorporated herein by reference. However, power distribution schemes within a network environment typically employ cumbersome, real estate intensive, magnetic transformers. Additionally, power over Ethernet (PoE) specifications under the IEEE 802.3 standard are stringent and often limit allowable power.

Many limitations are associated with use of magnetic transformers. Transformer core saturation can limit current that can be sent to a power device, possibly further limiting communication channel performance. Cost and board space associated with the transformer comprise approximately 10 percent of printed circuit board (PCB) space within a modern switch. Additionally, failures associated with transformers often account for a significant number of field returns. Magnetic fields associated with the transformers can result in lower electromagnetic compatibility (EMC) performance.

However, magnetic transformers also perform several important functions such as supplying DC isolation and signal transfer in network systems. Thus, an improved approach to distributing power in a network environment may be sought that addresses limitations imposed by magnetic transformers while maintaining transformer benefits.

SUMMARY

Embodiments disclosed herein describe a network device including a class AB common mode suppression (CMS) circuit coupled in parallel between a line voltage source and a physical layer (PHY) device that provides active Electro-Magnetic Interference (EMI) suppression and Phy device termination. A network connector is coupled to provide the line voltage source to the class AB CMS circuit. The class AB CMS circuit provides current to the PHY device, terminates open-drain transmit drivers of the PHY device, and suppresses common mode noise thereby minimizing EMI.

In other embodiments, a network device includes a class AB CMS circuit coupled to positive and negative input signals to the PHY device. The class AB CMS circuit is operable to block common-mode noise currents while passing differential mode data signal currents bi-directionally between the network connector and the PHY device. By doing this, the class AB CMS circuit can dramatically improve the electromagnetic compatibility (EMC) performance of the network device.

In still other embodiments, a network device is disclosed that includes a network connector and a class AB CMS circuit coupled between a line voltage source and a PHY module. The line voltage source and data signals are received via the network connector. The class AB CMS circuit is operable to provide data signals to the PHY device. The class AB CMS circuit includes a voltage source Vcc coupled between input leads to the PHY device, a first set of current sources coupled inline with the input leads between the voltage source Vcc and the PHY device, a second set of current sources coupled inline with the leads and to ground, sense resistors coupled in series between the input leads and the first and second sets of current sources, and an operational amplifier coupled to the current sources.

In other embodiments, the class AB CMS circuit is coupled in parallel between the network connector and a physical layer (PHY) device. The class AB CMS circuit suppresses common mode noise, and terminates open-drain transmit drivers of the PHY device, thereby minimizing electromagnetic interference.

BRIEF DESCRIPTION OF THE DRAWINGS

Embodiments of the invention relating to both structure and method of operation may best be understood by referring to the following description and accompanying drawings.

DETAILED DESCRIPTION

The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

Furthermore, conventional transformers create insertion loss and return loss as well as limit high frequency performance. Replacing a conventional transformer with non-magnetic transformer removes a major source of data signal degradation and helps enable high speed operation, for example, Gigabit and 10 Gigabit operation.

Figure 1A:
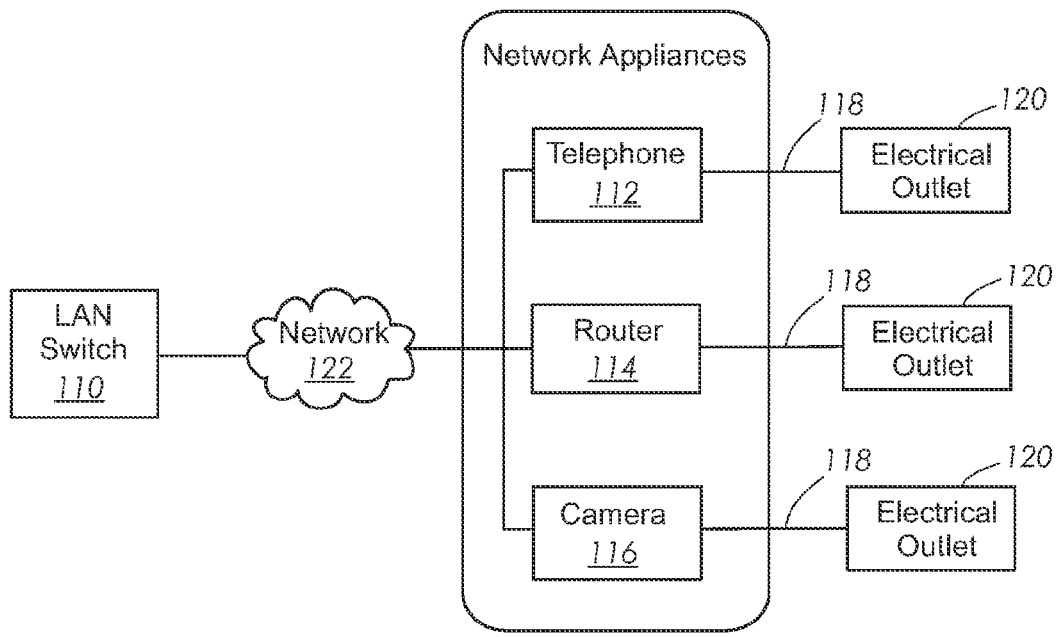
FIGS. 1A and 1B show embodiments of client devices in which power is supplied separately to network attached client devices, and a power-over Ethernet (PoE) enabled LAN switch that supplies both data and power signals to the client devices.
Figure 1B:
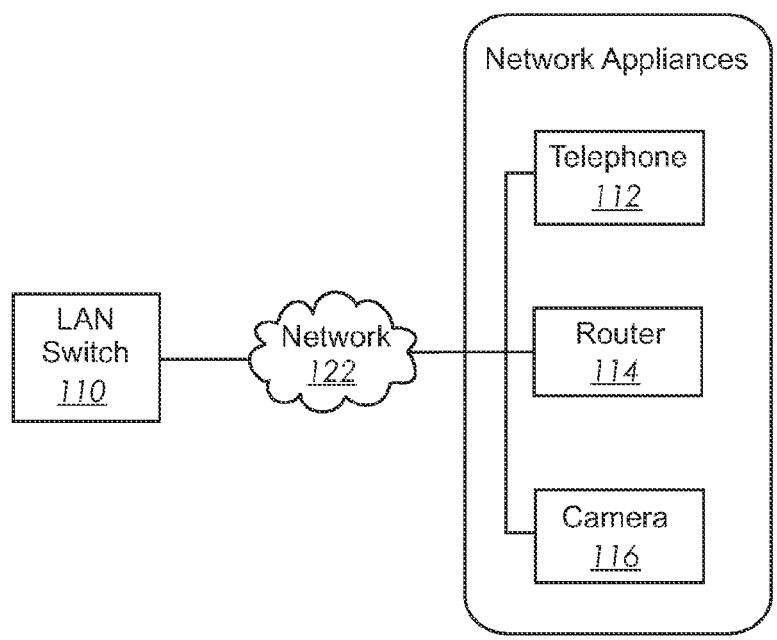

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard, such as HDSL (High bit-rate Digital Subscriber Line), T1/E1, cable modem, and other suitable technologies.

Typical conventional communication systems use transformers to perform common mode signal blocking, 1500 volt isolation, and AC coupling of a differential signature as well as residual lightning or electromagnetic shock protection. The functions are replaced by solid state or other similar circuits in accordance with embodiments of circuits and systems described herein whereby the circuit may couple directly to the line and provide high differential impedance and low common mode shunt impedance. High differential impedance enables separation of the physical layer (PHY) signal from the power signal. Low common mode shunt impedance facilitates elimination of magnetic chokes, thereby preventing EMI (Electro-Magnetic Interference) emissions and enabling EMI immunity. The local ground plane may float to eliminate a requirement for 1500 volt isolation. Additionally, voltage spike or lightning protection can be supplied to the network attached device through a combination of circuit techniques and lightning protection circuit, eliminating another function performed by transformers in traditional systems. The disclosed technology may be applied anywhere transformers are used and is not limited to Ethernet applications.

Specific embodiments of the circuits and systems disclosed herein may be applied to various powered network attached devices or Ethernet network appliances. Such appliances include, but are not limited to VoIP telephones, routers, printers, and other suitable devices.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

Figure 2:
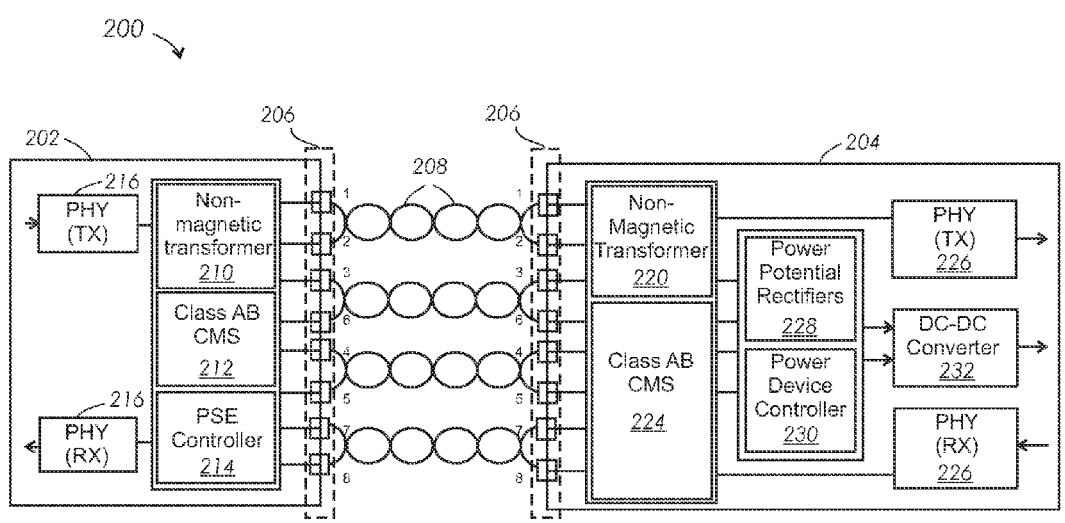
FIG. 2 shows an embodiment of a network interface device including a network powered device (PD) interface and a network power supply equipment (PSE) interface, each implementing a non-magnetic transformer and choke circuit.

Referring to FIG. 2, a functional block diagram depicts an embodiment of a network device 200 including power source equipment (PSE) interface 202 coupled to powered device (PD) interface 204 via respective network connectors 206 and multiple twisted pair conductors 208 between connectors 206. Twisted pair conductors 208 can be, for example, twisted 22-26 gauge wire and connectors 206 can be RJ-45 connectors. Other suitable conductors and connectors can be used.

In the embodiment shown, PSE interface 202 includes non-magnetic transformer 210, Class AB common mode suppression (CMS) circuit 212, and power source equipment (PSE) controller 214 coupled between physical layer (PHY) device 216 and connector 206. Non-magnetic transformer 210 and Class AB CMS circuit 212 are implemented in integrated circuitry and replace the functionality of a magnetic transformer. Replacing magnetic transformers with solid state power feed circuit in the form of an integrated circuit or discreet component enables increased component density.

PD interface 204 can include non-magnetic transformer 220 and Class AB CMS circuit 222 coupled between another connector 206 and PHY device 226. Power potential rectifiers 228 and power device controller 230 can be coupled between connector 206 and DC-DC converter 232.

Power potential rectifiers 228 rectify and pass a received power signal to ensure proper signal polarity is applied to DC-DC converter 230. The network device 200 typically sources power through lines 3, 4, 5, and 6 of the network connectors 206, however, other lines can be used. Power potential rectifiers 228 may be a diode bridge or other rectifying component or device. The circuits may be discrete components or an integrated circuit. Any one of a subset of the twisted pair conductors 208 can forward bias to deliver current, and the power potential rectifiers 228 can forward bias a return current path via a remaining conductor of the subset.

Power device controller 230 may be used to control power supply to network attached devices. The power signals are supplied by power potential rectifiers 228 to converter 232. Typically the power signal received does not exceed 57 volts SELV (Safety Extra Low Voltage). Typical voltage in an Ethernet application is 48-volt power. Converter 232 may then further transform the power to provide 1.8 to 12 volts, or other voltages specified by many Ethernet network attached devices, such as wireless access point circuitry or IP telephony circuitry.

If the PD interface 204 is used in an Ethernet network, may support the 10/100/1000 Mbps data rate and other future data networks such as a 10000 Mbps Ethernet network as well as other Ethernet data protocols that may arise. An Ethernet PHY device 226 may additionally couple to an Ethernet media access controller (MAC) (not shown). The PHY device 226 and Ethernet MAC when coupled can implement the hardware layers of an Ethernet protocol stack. The architecture may also be applied to other networks and protocols. If a power signal is not received but a traditional, non-power Ethernet signal is received at connector 206, the PD interface 204 still passes the data signal to the PHY device 226.

PSE interface 202 and PD interface 204 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive and aircraft networks for the distribution of power and data to various monitoring circuits or for the distribution and powering of entertainment devices, such as entertainment systems, video and audio entertainment systems often found in today's transportation. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a HomePNA local area network and other similar networks. HomePNA uses existing telephone wires to share a single network connection within a home or building. Alternatively, embodiments may be applied where network data signals are provided over power lines.

In some embodiments, non-magnetic transformer 210, Class AB CMS circuit 212, PHY devices 216, 226, PSE controller 214, non-magnetic transformer 220, CMS circuit 222, rectifiers 228, PD controller 230, and converter 232 may be implemented in integrated circuits rather than discrete components at the printed circuit board level. The circuits may be implemented in any appropriate process, for example, power components may be implemented using a high voltage silicon on insulator process whereas other components can be implemented using a 0.18 or 0.13 micron process or any suitable process. In other embodiments, the Class AB CMS circuit 224 and the PHY device 226 can be implemented in the same integrated circuit process technology.

Network device 200 may implement functions including IEEE 802.3.af signaling and load compliance, local unregulated supply generation with over current protection, and signal transfer between the lines 208 and integrated Ethernet PHY devices 216, 226. Since devices are directly connected to the line 208, the device 200 may be implemented to withstand a secondary voltage surge.

Non-magnetic transformer 210 and Class AB CMS circuit 212 may take the form of a single or multiple port switch to supply power to single or multiple devices attached to the network. Power sourcing equipment interface 202 may be operable to receive power and data signals and combine to communicate power signals which are then distributed via an attached network. If power sourcing equipment interface 202 is included in a gateway or router computer, a high-speed uplink couples to a network such as an Ethernet network or other network. The data signal is relayed via network PHY 216 and supplied to non-magnetic transformer 210 and Class AB CMS circuit 212. PSE interface 202 may be attached to an AC power supply or other internal or external power supply to provide a power signal to be distributed to network-attached devices that couple to connector 206.

Power sourcing equipment (PSE) controller circuit 214 implemented within or coupled to non-magnetic transformer 210 and Class AB CMS circuit 212 may determine, in accordance with IEEE standard 802.3af or other suitable standard, whether a network-attached device is operable to receive power via PD interface 204. When determined that a compliant powered device (PD) is attached to the network, PSE controller circuit 214 may supply power from power supply to non-magnetic transformer 210. The power sent to the downstream network-attached device through network connectors 206, which in the case of the Ethernet network may be an RJ45 receptacle and cable.

IEEE 802.3af Standard is to fully comply with existing non-line powered Ethernet network systems. Accordingly, PSE controller 214 can detect via a well-defined procedure whether the attached devices are PoE compliant and provide sufficient power to the attached devices. In some implementations, the maximum allowed voltage is 57 Volts for compliance with SELV (Safety Extra Low Voltage) limits.

For backward compatibility with non-powered systems, PSE interface 202 can apply very low level power initially and higher power after confirming that a PoE device is present. For example, PSE controller 214 can apply a voltage between 14.5 Volts and 20.5 Volts during a classification phase to measure the current and determine the power class of a device. In some embodiments, the current signature is applied for voltages above 12.5 Volts and below 23 Volts. A current signature range can be used, for example, 0-44 milliamperes.

A maintain power signature can be applied in the PoE signature block. For example, a minimum of 10 mA and a maximum of 23.5 kilo-ohms may be applied for the PSE interface 202 to continue to feed power. The maximum current allowed is limited by the power class of the device, with class 0-3 typically being defined. For class 0, 12.95 Watts is the maximum power dissipation allowed and 400 milliamperes is the maximum peak current. Once activated, the PoE will shut down if the applied voltage falls below 30V and disconnect from the line 208.

PSE interface 202 in normal power mode provide a differential open circuit at the Ethernet signal frequencies and a differential short at lower frequencies. Non-magnetic transformer 210 and Class AB CMS circuit 212 can present the capacitive and power management load at frequencies determined by PSE controller circuit 214.

Figure 3:
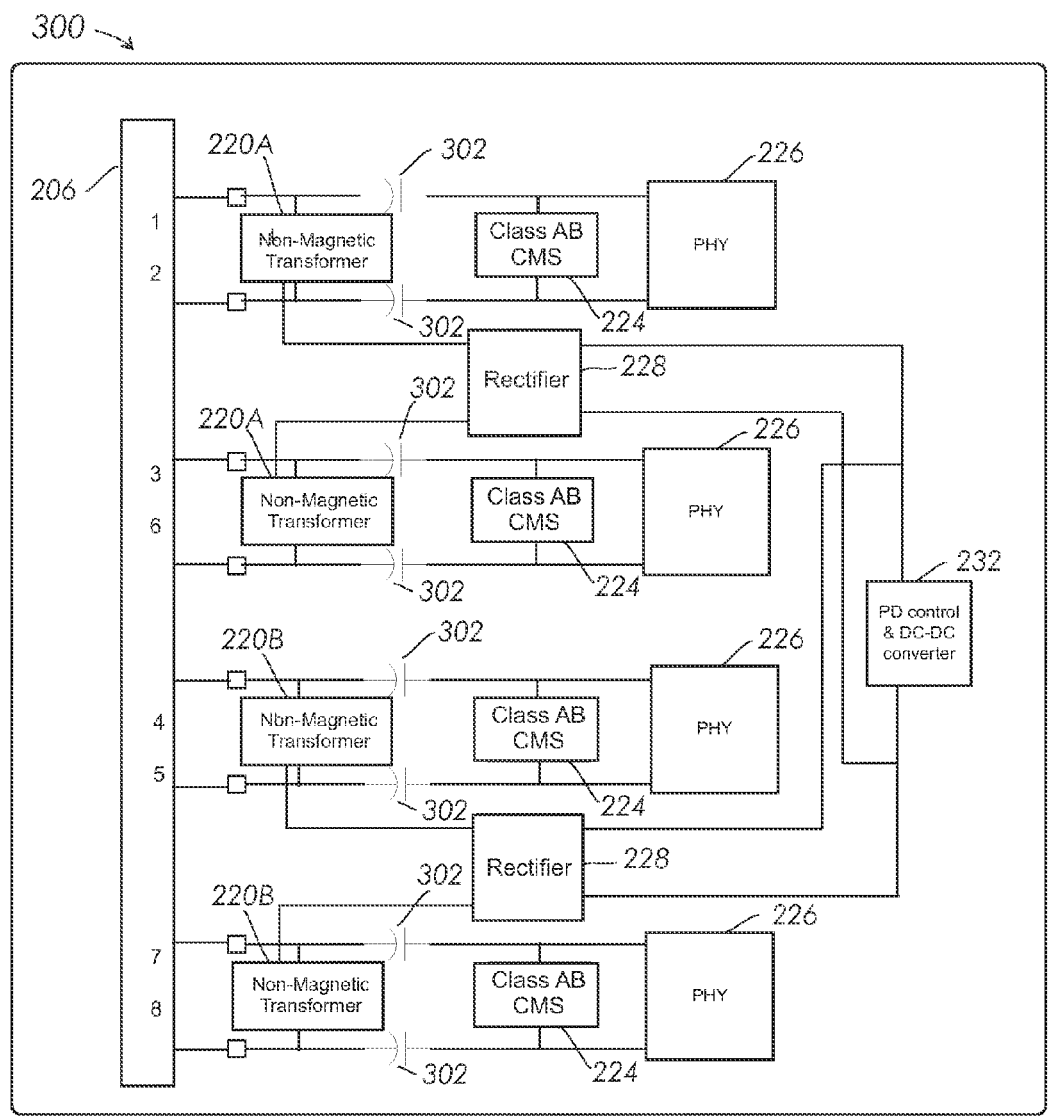
FIG. 3 is a diagram of an example of a configuration for a network interface device that includes non-magnetic transformers, class AB CMS circuits, and diode bridges to rectify power signals received from the transformers.

Referring to FIG. 3, a schematic circuit diagram of an embodiment of powered device (PD) interface 300 is shown that is suitable for use as PD interface 204 in FIG. 2. PD interface 300 includes connector 206 coupled to non-magnetic transformer circuits 220A, 220B. Non-magnetic transformer circuit 220A is connected across line pairs 1 and 2, and 3 and 6. Non-magnetic transformer circuit 220B is connected across line pairs 4 and 5, and 7 and 8. Capacitors 302 are coupled between transformers 220A, 220B and PHY devices 226. Class AB CMS circuits 224 are coupled in parallel between respective non-magnetic transformer circuits 220A, 220B and PHY devices 226. The non-magnetic transformers 220 are coupled to transmit and receive signal pairs from the network connector 206 and provide DC common-mode control and current sourcing to the PHY device 226.

In most Ethernet systems, physical layer transceiver uses an open drain style output stage. The output stage relies on data transformer's center tap to set the DC common mode level and act as current source between the center tap power supply and the medium dependent interface (MDI) signals. The inductance of the transformer provides a short-circuit at DC, and higher differential impedance at higher frequencies that allows transmission of a local data signal to the line.

As described previously, transformers create a variety of data integrity impairments in the transmission system, such as return loss, common-to-differential mode conversion, etc., and have reliability and cost issues associated with them. In a transformer-less interface, such as PD interface 300, PHY output stage DC control and current sourcing functionality can be supported by an active Class AB CMS circuit 224. The active Class AB CMS circuit 224 can be integrated with PHY devices 226, and other circuits in PD interface 300 in the same integrated circuit package to reduce the number of components and required circuit board space, thereby reducing the cost of the communication system.

Figure 4:
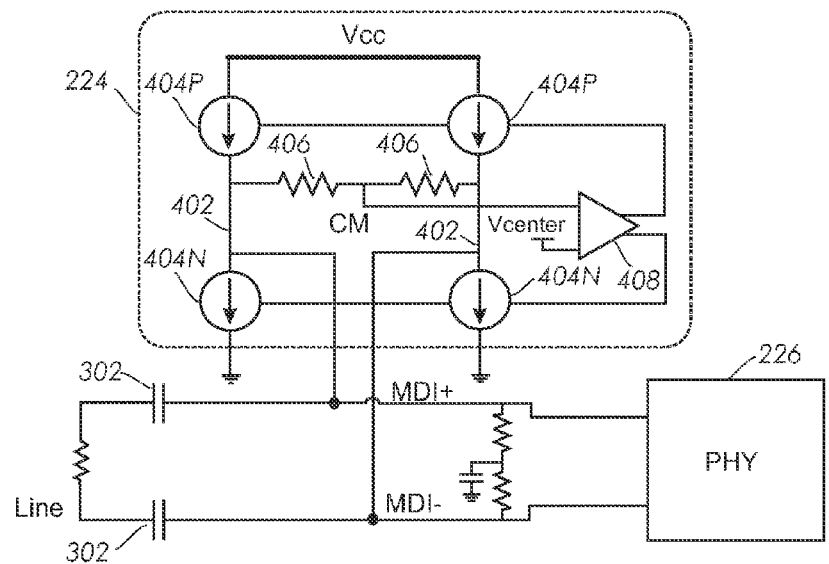
FIG. 4 is a diagram of the system-level architecture an embodiment of a class AB CMS circuit.

Class AB CMS circuit 224 provides termination of open-drain transmit drivers of a physical device along with common-mode (CM) output voltage control and a current source to the PHY device 226. FIG. 4 shows an embodiment of Class AB CMS circuit 224 that includes voltage source Vcc coupled between leads 402, and current sources 404P, 404N coupled inline with leads 402 between voltage source Vcc and ground. Branches from leads 402 taken between current sources 404P and 404N are coupled to respective positive and negative medium dependent interface (MDI) input signals to PHY device 226. A pair of sense resistors 406 are coupled in series between positive and negative leads 402, and current sources 404P and 404N. Common mode (CM) lead is coupled between first and second sense resistors 406, and operational amplifier 408. The sense resistors 406 provide the function of summing up the signals from MDI positive and negative leads that cancels the differential component of the signal and retains only the common mode component of the signal on the CM lead. A center voltage is supplied to another input of operational amplifier 408. A signal representing the difference between the CM input signal and the center voltage signal is output by operational amplifier 408 and supplied to current sources 404P, 404N. The class AB CMS circuit 224 operates to block common-mode noise currents while passing differential data signal current bi-directionally between the communication lines and the PHY device 226. A common mode voltage level is controlled by active common-mode feedback in the Class AB CMS circuit 224 through the operational amplifier 408 to provide a high differential mode impedance in a frequency band of interest for signals to PHY device 226.

Figure 5:
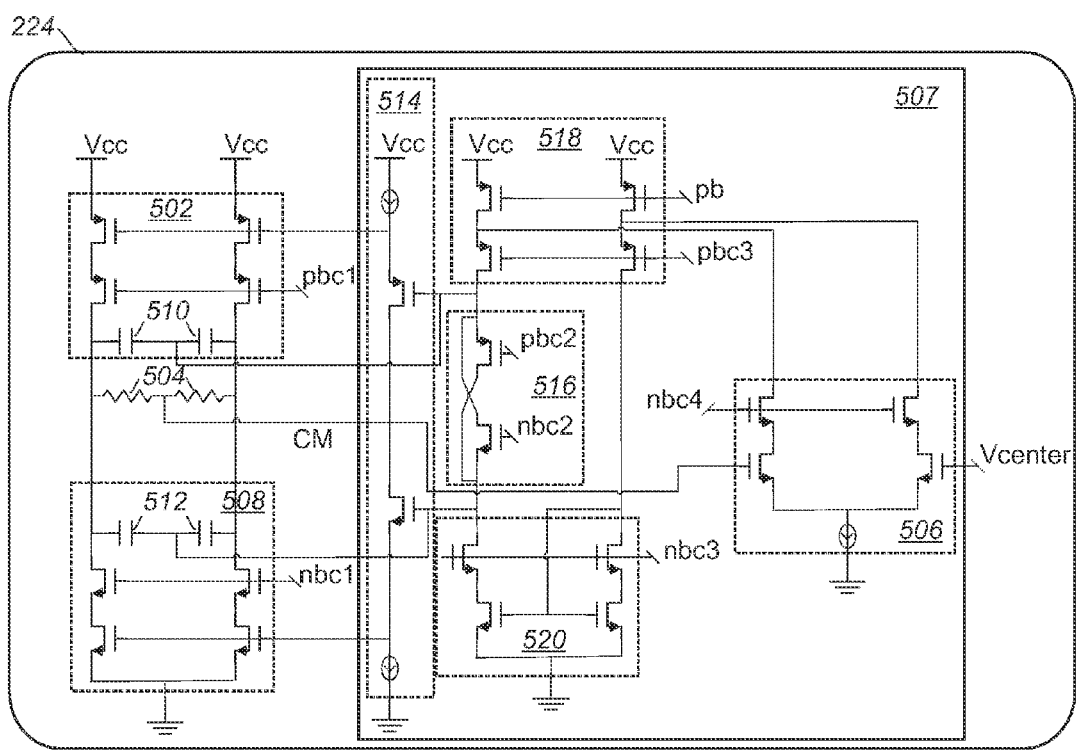
FIG. 5 is a diagram of an embodiment of a class AB CMS circuit.

An embodiment of Class AB CMS circuit 224 is shown in greater detail in FIG. 5 including a voltage source Vcc coupled to current sources 502, 508 on input leads. Sense resistors 504 are coupled in series between the input leads. A common mode (CM) lead is coupled between the sense resistors 504 and an input stage 506 of an operational amplifier 507. A center voltage is also coupled to the input stage 506 of the operational amplifier 507. The operational amplifier 507 is adapted to output a signal to the current sources 502, 508, where the signal from the operational amplifier 507 represents the difference between a signal from the CM lead and the center voltage. The operational amplifier 507 has high open loop gain which will help class AB CMS circuit 224 to have very low common mode impedance to suppress the common mode EMI noise. The operational amplifier 507 typically uses devices implemented using low voltage process technology, for example, 1.8 volts or 1.3 volts, to get benefit from faster devices. Properly biasing these low voltage devices in amplifier 507 to make sure there are no electrical overstress will prolong product life.

The class AB CMS circuit 224 further includes a class AB bias circuit 516, and a current mirror 514 is coupled between the current sources 502, 508 and the class AB bias circuit 516. Bias circuit 516 sets the keep-alive currents for current sources 502, 508, which allows current sources 502, 508 to operate in the linear region thereby avoiding distortion. Current mirror 514 provides level shifting for DC voltage and protects class AB CMS circuit 224 from stress. A first stress relief circuit 518 is coupled to the class AB bias circuit 516 and the input stage circuit 506. A second stress relief circuit 520 is coupled to the class AB bias circuit 516 and the first stress relief circuit 518.

A first set of feedback capacitors 510 is coupled in series between the leads, and between the first set of current sources 502 and the sense resistors 504. A second set of feedback capacitors 512 is coupled in series between the leads, and between the sense resistors 504 and the second set of current sources 508.

The first set of current sources 502 includes two pairs of p-channel transistors. The second set of current sources 508 includes two pairs of n-channel transistors. The gates of the transistors are coupled to one another in each of the pairs.

The class AB bias circuit 516 includes a p-channel transistor and a n-channel transistor. The source of the p-channel transistor is coupled to the drain of the n-channel transistor. The source of the n-channel transistor is coupled to the drain of the p-channel transistor.

The first stress relief circuit 518 is coupled to the source of the p-channel transistor of the class AB bias circuit 516. A second stress relief circuit 520 is coupled to the source of the n-channel transistor of the class AB bias circuit 516.

The first stress relief circuit 518 includes two pairs of p-channel transistors, and the second stress relief circuit 520 comprises two pairs of n-channel transistors. The gates of the transistors are coupled in each of the pairs. The sources of one pair of the n-channel transistors are coupled to ground. The gates of the n-channel transistors are coupled between the drain of one of the n-channel transistors in the other pair and the drain of one of the p-channel transistors in the first stress relief circuit 518.

The topology of class AB CMS circuit 224 minimizes capacitance and enables high output voltage swing range. Thus, relatively high power supply voltages, for example, 5 volts, can be handled with components that are implemented using low voltage process technology, for example, 1.8 volts or 1.3 volts. Using lower voltages across devices terminals throughout class AB CMS circuit 224 helps protect the components from damage due to high voltage.

Figure 6:
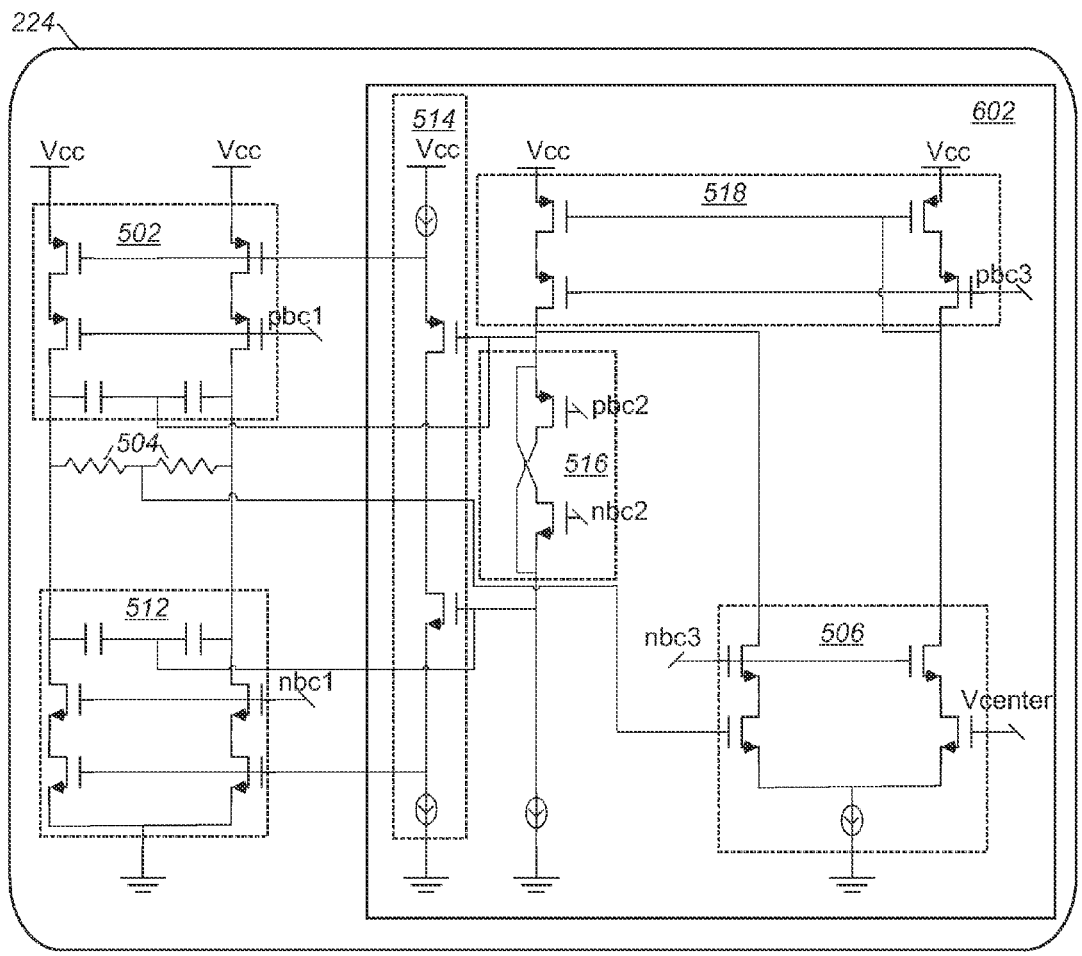
FIG. 6 is a diagram of another embodiment of a class AB CMS circuit.

Referring now to FIG. 6, another embodiment of class AB CMS circuit 224 is shown that utilizes fewer components in operational amplifier 602 and also utilizes less power, than the operational amplifier 507 shown in FIG. 5. In particular, operational amplifier 602 includes only one stress relief circuit 518, instead of the two stress relief circuits 518, 520 shown in FIG. 5. This embodiment requires less power and eases the physical layout of the circuit.

Figure 7:
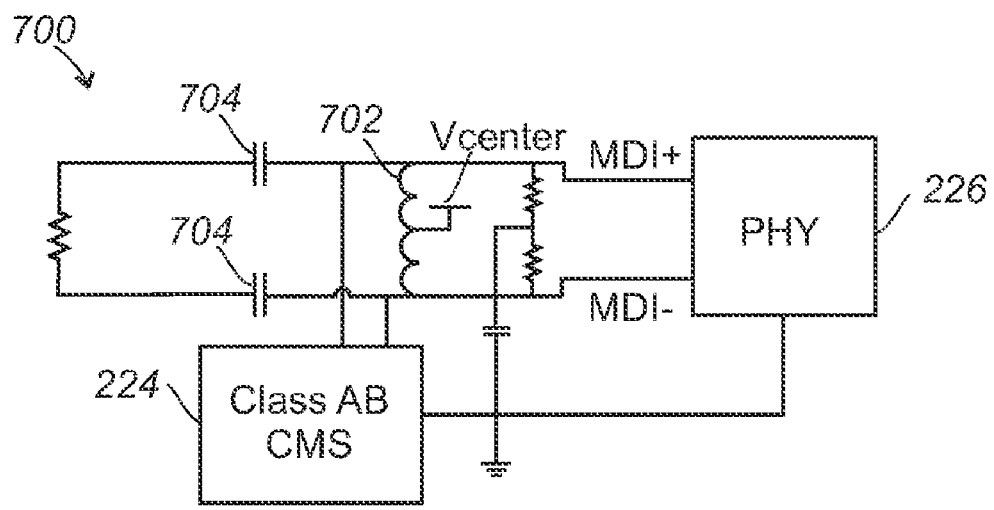
FIG. 7 is a diagram of an alternate embodiment of a network interface device that includes autotransformers.

An alternate embodiment of a PD interface 700 that achieves the functionality of Class AB CMS circuit 224 is shown in FIG. 7 with class AB CMS circuit 224 coupled to autotransformer 702. Autotransformer 702 is an electrical transformer with only one winding that replaces the winding of a magnetic transformer coupled to PHY module 226 in conventional systems. The winding has at least three electrical connection points called taps. The center tap can be connected to a power supply to feed current to circuits connected to the other 2 taps. Autotransformers have the same manufacturing, reliability, and data impairment issues as magnetic transformers. In addition, using autotransformer 702 in conjunction with blocking capacitors 704 creates a second order high pass pole in path of network data transmission, compared to a first order high pass pole in traditional transformer based system. Such a second order pole will create higher loss of low frequency signal from data-transmission, creating issues such as baseline wander where under certain transmitted data patterns, the receiver can not recover the signal correctly due to loss of low frequency portion of the signal. PD interface 700 with autotransformer 702 avoids that problem by maintaining a first order high pass pole in the path of transmitted signal.

Figure 8:
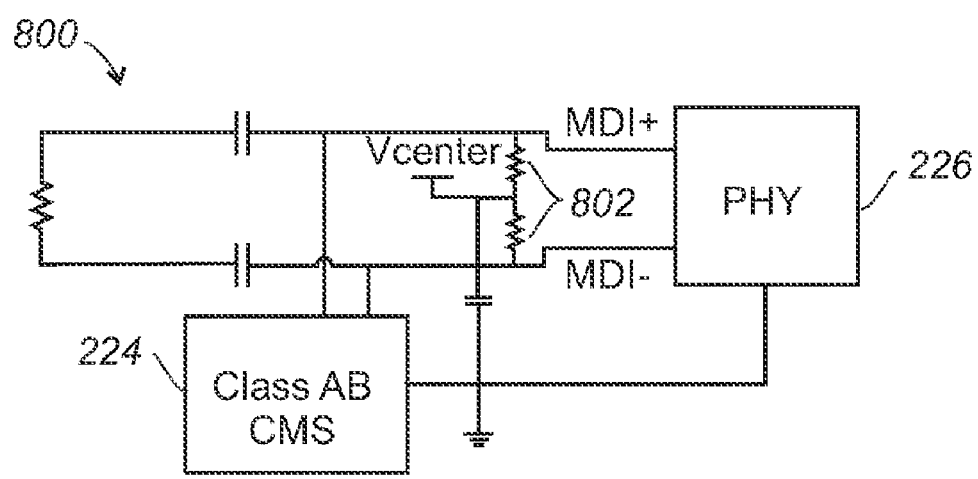
FIG. 8 is a diagram of an alternate embodiment of a network interface device.

Another alternate way to achieve the functionality of Class AB CMS circuit 224 is to couple class AB CMS circuit 224 to termination resistors 802 without using autotransformer 702, as shown by the embodiment of powered device interface 800 in FIG. 8. Interface 800 takes advantage of the ability of class AB CMS circuit 224 to control and maintain the DC common mode level at the MDI signals. Eliminating the autotransformer 702 (FIG. 7) in interface 800 can eliminate the second order high pass pole associated with the autotransformer as well as reduce costs and board space requirements.

PD interfaces 700 and 800 are feasible alternatives for some systems that can tolerate issues highlighted above, however a properly designed active Class AB CMS circuit 224, some embodiments of which have been described herein, enable use of PD interfaces 204 with nonmagnetic transformers 220 (FIG. 2) with the widest range of transmission systems, including but not limited to, Power-over-Ethernet and traditional non-power over Ethernet systems.

Referring again to FIG. 3, non-magnetic transformers 220A, 220B receive input signals from the network connector 206. The first rectifier 228/non-magnetic transformer circuit 220A receives input power and data signals from across lines 1 and 2, and across lines 3 and 6 of the network connector 206. A second rectifier 228/non-magnetic transformer circuit 220B receives input power and data signals from across lines 4 and 5, and across lines 7 and 8 of the network connector 206. For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to PD controller and DC-DC converter circuits 232.

The illustrative PD interface 300 may be implemented as part of a powered device (PD) that receives power sourced by power sourcing equipment (PSE), for example, on line pairs 1 and 2, and 3 and 6 on the network connector 206. One of the two pair of connections is at supply potential, for example VDD, and one is at ground potential. Power is applied to the two input terminals of rectifier circuits 228 at a high potential and a low potential but the potential applied to a particular input terminal is not important. Rectifier circuits 228 rectify the power signal so that no matter how power is connected, one output line is always at the VDD supply potential (VDD OUT) and another output line is at ground potential (GND OUT). Examples of rectifier circuits 228 that can be used include diode bridge rectifier circuits or MOSFET bridge rectifier circuits, among others.

Figure 9:
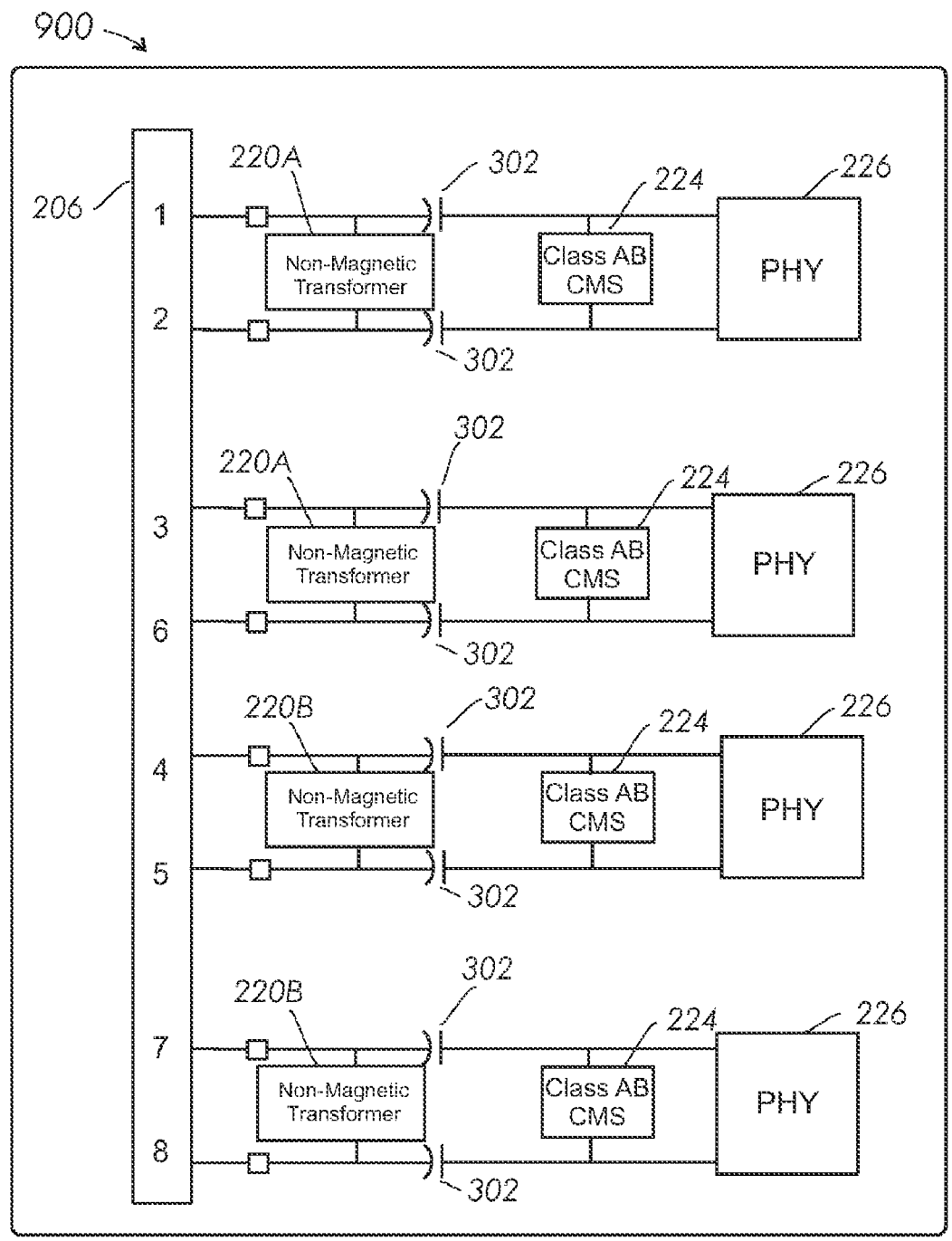
FIG. 9 shows another embodiment of a network interface device for non-Power Over Ethernet applications.

Referring to FIG. 9, a schematic circuit diagram of another embodiment of network interface 900 is shown that is suitable for use as a network interface for a non-Power over Ethernet application. Network interface 900 includes connector 206 coupled to non-magnetic transformer circuits 220A, 220B. Non-magnetic transformer circuit 220A is connected across line pairs 1 and 2, and 3 and 6. Non-magnetic transformer circuit 22B is connected across line pairs 4 and 5, and 7 and 8. Capacitors 302 are coupled between transformers 220A, 220B and PHY devices 226. CMS circuits 222 and Class AB CMS circuits 224 are coupled in parallel between respective non-magnetic transformer circuits 220A, 220B and PHY devices 226.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. A network device comprising:
   a network connector; and
   a class AB common mode suppression (CMS) circuit coupled in parallel between the network connector and a physical layer (PHY) device; wherein
   the network connector is coupled to provide a line voltage source to the class AB CMS circuit, and the class AB CMS circuit suppresses common mode noise to provide active Electro-magnetic interference (EMI) suppression and terminates open-drain transmit drivers of the PHY device;
   wherein the class AB CMS circuit includes:
      leads are coupled to respective positive and negative medium dependent interface (MDI) input signals to the PHY device;
      a voltage source Vcc coupled between the leads,
      a first set of current sources coupled inline with the leads between the voltage source Vcc and MDI input signals to the PHY device,
      sense resistors coupled in series between the leads,
      a common mode (CM) lead coupled between the sense resistors and an operational amplifier, and
      a second set of current sources coupled inline with the leads between the sense resistors and ground.

2. The network device according to claim 1 further comprising:
   the class AB CMS circuit includes:
      a center voltage coupled to the operational amplifier, the operational amplifier being adapted to output a signal to the first and second sets of current sources, where the signal from the operational amplifier represents the difference between a signal from the CM lead and the center voltage.

3. The network device according to claim 2 further comprising:
   a class AB bias circuit; and
   a current mirror coupled between the first and second sets of current sources and the class AB bias circuit.

4. The network device according to claim 3 further comprising:
   the class AB bias circuit including a p-channel transistor and a n-channel transistor, a source of the p-channel transistor is coupled to a drain of the n-channel transistor, and a source of the n-channel transistor is coupled to a drain of the p-channel transistor;
   a first stress relief circuit coupled to the source of the p-channel transistor of the class AB bias circuit; and
   a second stress relief circuit coupled to the source of the n-channel transistor of the class AB bias circuit.

5. The network device according to claim 4 further comprising:
   the first stress relief circuit comprises two pairs of p-channel transistors, and
   the second stress relief circuit comprises two pairs of n-channel transistors, and gates of the transistors are coupled in each of the pairs.

6. The network device according to claim 5 further comprising:
   one pair of the n-channel transistors is configured with:
      the sources coupled to ground, and
      the gates coupled between the drain of one of the n-channel transistors in the other pair and the drain of one of the p-channel transistors in the first stress relief circuit.

7. The network device according to claim 2 wherein:
   the first set of current sources comprise two pairs of p-channel transistors, and
   the second set of current sources comprise two pairs of n-channel transistors, and gates of the transistors are coupled in each of the pairs.

8. The network device according to claim 7 further comprising:
   an input stage circuit coupled to the first stress relief circuit and the sense resistors.

9. The network device according to claim 7 wherein:
   a rectifying circuit adapted to conductively couple the network connector to an integrated circuit that rectifies and passes a power signal received from the network connector , wherein the rectifying circuit regulates a received power and/or data signal to ensure proper signal polarity is applied to the integrated circuit.

10. The network device according to claim 9 wherein:
    the network connector receives a plurality of twisted pair conductors; and
    any one of a subset of the twisted pair conductors can forward bias to deliver current and the rectifying circuit forward biases a return current path via remaining conductors of the subset.

11. The network device according to claim 10 wherein the rectifying circuit includes a diode bridge.

12. The network device according to claim 1 wherein:
    a first set of feedback capacitors coupled in series between the leads, and between the first set of current sources and the sense resistors; and
    a second set of feedback capacitors coupled in series between the leads, and between the sense resistors and the second set of current sources.

13. The network device according to claim 1 wherein:
    the class AB CMS circuit is operable to block common-mode noise currents while passing differential data signal current bi-directionally between the communication line and the PHY device.

14. The network device according to claim 1 wherein:
    a common mode voltage level is controlled by active common-mode feedback in the Class AB CMS circuit through an operational amplifier to provide a high differential mode impedance in a frequency band of interest for signals to PHY device.

15. The network device according to claim 1 wherein:
    the Class AB CMS circuit and the PHY device are implemented in the same integrated circuit process technology.

16. The network device according to claim 1 wherein:
    the Class AB CMS circuit is implemented using low voltage process technology.

17. The network device according to claim 1 further comprising:
    a non-magnetic transformer coupled to transmit and receive signal pairs from a network connector and provide DC common-mode control and current sourcing to the PHY device.

18. A network device comprising:
    a network connector;
    a class AB CMS circuit coupled between a line voltage source and a PHY module, wherein the line voltage source and data signals are received via the network connector, the class AB CMS circuit is operable to provide data signals to the PHY device, and the class AB CMS circuit includes:
       a voltage source Vcc coupled between input leads to the PHY device;

a first set of current sources coupled inline with the input leads between the voltage source Vcc and the PHY device;

a second set of current sources coupled inline with the leads and to ground;

sense resistors coupled in series between the input leads and the first and second sets of current sources; and an operational amplifier coupled to the current sources.

19. The network device according to claim 18 wherein: the class AB CMS circuit further includes:

a common mode (CM) lead coupled between the sense resistors and the operational amplifier.

20. The network device according to claim 18 wherein: the class AB CMS circuit further includes:

a center voltage coupled to the operational amplifier, the operational amplifier being adapted to output a signal to the current sources, where the signal from the operational amplifier represents the difference between a signal from the CM lead and the center voltage.

21. The network device according to claim 18 wherein: the input leads to the PHY device transmit positive and negative medium dependent interface (MDI) input signals to the PHY device.

22. The network device according to claim 18 wherein: the class AB CMS circuit is operable to block common-mode noise currents while passing operational data signals bi-directionally between the network connector and the PHY device.

23. The network device according to claim 18 further comprising:

a first set of feedback capacitors coupled in series between the leads, and between the first set of current sources and the sense resistors; and a second set of feedback capacitors coupled in series between the leads, and between the sense resistors and the second set of current sources.

24. The network device according to claim 18 wherein:

a common mode voltage level is controlled by active common-mode feedback in the Class AB CMS circuit through the operational amplifier to provide a high differential mode impedance in a frequency band of interest for signals to PHY device.

25. The network device according to claim 18 further comprising:

a non-magnetic transformer coupled to transmit and receive signal pairs from the network connector and provide DC common-mode control and current sourcing to the PHY device.

26. The network device according to claim 18 further comprising:

a class AB bias circuit; and a current mirror coupled between the first and second sets of current sources and the class AB bias circuit.

27. The network device according to claim 18 wherein: the first set of current sources comprise two pairs of p-channel transistors, and the second set of current sources comprise two pairs of n-channel transistors, and gates of the transistors are coupled in each of the pairs.

28. The network device according to claim 18 further comprising:

a class AB bias circuit including a p-channel transistor and a n-channel transistor, a source of the p-channel transistor is coupled to a drain of the n-channel transistor, and a source of the n-channel transistor is coupled to a drain of the p-channel transistor;

a stress relief circuit coupled to the source of the p-channel transistor of the class AB bias circuit.

29. The network device according to claim 28 further comprising:

the first stress relief circuit comprises two pairs of p-channel transistors, and gates of the transistors are coupled in each of the pairs.

30. The network device according to claim 28 further comprising:

the source of the n-channel transistor in the class AB bias circuit is coupled to ground.

31. The network device according to claim 28 further comprising:

an input stage circuit including two pairs of n-channel transistors, one of the n-channel transistors in one of the pairs includes a gate coupled to the sense resistors, a source coupled to ground, and a drain coupled to the source of one of the transistors in the other pair of transistors, the gate of the other transistor in the one of the pairs is coupled to a center voltage, the gates of the other pair of transistors are coupled together, the drain of one of the transistors in the other pair is coupled to the stress relief circuit, and the drain of the other of the other pair of transistors is coupled between the stress relief circuit and the class AB bias circuit.

32. A network device comprising:

a connector;

a non-magnetic transformer coupled to the connector;

a class AB CMS circuit coupled between the non-magnetic transformer and a physical layer (PHY) module, wherein data signals are received via the connector, and the class AB CMS circuit is operable to provide data signals to a physical (PHY) device and the class AB CMS circuit includes:

a voltage source Vcc coupled between input leads to the PHY device:

a first set of current sources coupled inline with the input leads between the voltage source Vcc and the PHY device;

a second set of current sources coupled inline with the leads and to ground.

33. The network device according to claim 32 wherein: the class AB CMS circuit further includes:

sense resistors coupled in series between the input leads, and a common mode (CM) lead coupled between the sense resistors and an operational amplifier.

34. The network device according to claim 32 wherein: the class AB CMS circuit further includes:

a center voltage coupled to the operational amplifier, the operational amplifier being adapted to output a signal to the current sources, where the signal from the operational amplifier represents the difference between a signal from the CM lead and the center voltage.

35. The network device according to claim 32 wherein: the class AB CMS circuit further includes:

a class AB bias circuit, and a current mirror coupled between the current sources and the class AB bias circuit.

36. The network device according to claim 35 wherein:
the class AB CMS circuit further includes:
- an input stage circuit; and
- a first stress relief circuit coupled to the class AB bias circuit and the input stage circuit.

37. The network device according to claim 35 wherein:
the class AB CMS circuit further includes:
- a second stress relief circuit coupled to the class AB bias circuit and the first stress relief circuit.

38. A network device comprising:
a network connector;
a class AB common mode suppression (CMS) circuit coupled in parallel between the network connector and a physical layer (PHY) device; wherein
the class AB CMS circuit suppresses common mode noise, and terminates open-drain transmit drivers of the PHY device, thereby minimizing electromagnetic interference,
the class AB CMS circuit includes:
- leads are coupled to respective positive and negative medium dependent interface (MDI) input signals to the PHY device,
- a voltage source Vcc coupled between the leads,
- a first set of current sources coupled inline with the leads between the voltage source Vcc and MDI input signals to the PHY device,
- sense resistors coupled in series between the leads,
- a common mode (CM) lead coupled between the sense resistors and an operational amplifier, and
- a second set of current sources coupled inline with the leads between the sense resistors and ground.

39. The network device according to claim 38 wherein:
the class AB CMS circuit includes:
- a center voltage coupled to the operational amplifier, the operational amplifier being adapted to output a signal to the first and second sets of current sources, where the signal from the operational amplifier represents the difference between a signal from the CM lead and the center voltage.

40. The network device according to claim 38 wherein:
a first set of feedback capacitors coupled in series between the leads, and between the first set of current sources and the sense resistors; and
a second set of feedback capacitors coupled in series between the leads, and between the sense resistors and the second set of current sources.

41. The network device according to claim 38 wherein:
a common mode voltage level is controlled by active common-mode feedback in the Class AB CMS circuit through an operational amplifier to provide a high differential mode impedance in a frequency band of interest for signals to PHY device.

* * * * *